Figure 1:
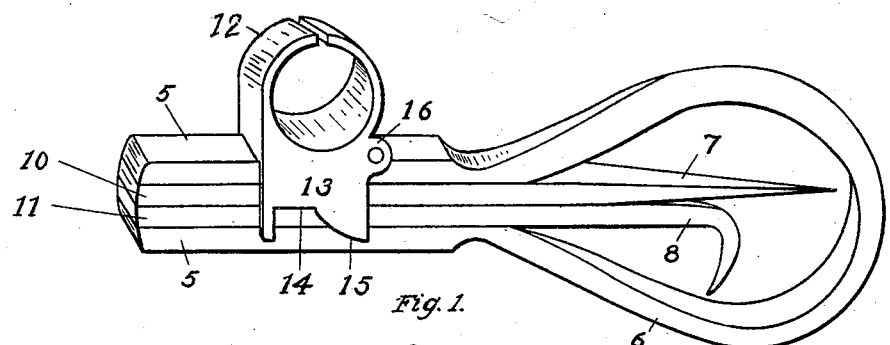

C. FISK.
MINER'S CANDLESTICK.
APPLICATION FILED MAR. 22, 1909.

938,838.

Patented Nov. 2, 1909.

WITNESSES
E. C. Howe
A. L. M. Howe

INVENTOR
Carl Fisk
BY
Max A. Schmidt
ATTORNEY.

UNITED STATES PATENT OFFICE.

CARL FISK, OF SPOKANE, WASHINGTON.

MINER'S CANDLESTICK.

938,838.  Specification of Letters Patent.  Patented Nov. 2, 1909.

Application filed March 22, 1909. Serial No. 484,975.

*To all whom it may concern:*

Be it known that I, CARL FISK, a citizen of the United States, residing at Spokane, in the county of Spokane and State of Washington, have invented certain new and useful Improvements in Miners' Candlesticks, of which the following is a specification.

This invention relates to candle sticks, such as are used by miners, and which are adapted to be stuck into, or hung on the walls of tunnels, galleries, or the like.

The object of the present invention is to provide a candle stick of the kind stated which is foldable into small compass, so that it may be conveniently carried in the pocket; together with novel means for holding the parts in closed or open position; as well as a candle holder which may be set right or left-handed.

With the foregoing object in view, the invention consists in a novel construction and arrangement of parts to be hereinafter described and claimed, reference being had to the drawing hereto annexed forming a part of this specification, in which drawing—

Figure 2:
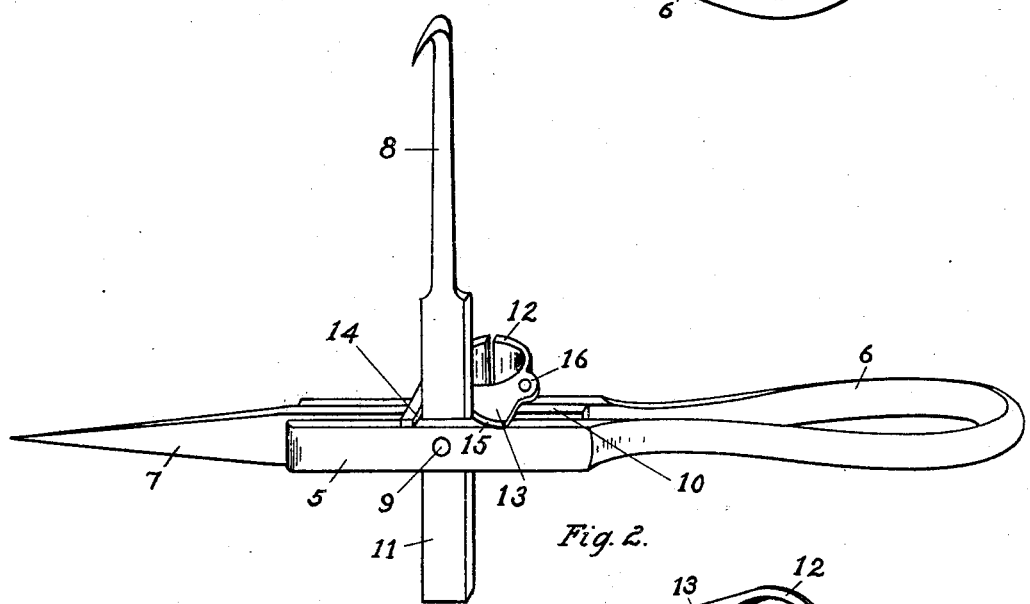
Figure 3:
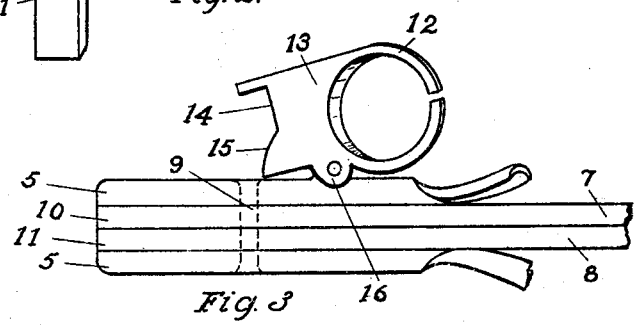

Figure 1 is a perspective view of the implement folded. Fig. 2 is a similar view showing the implement in open position ready for use. Fig. 3 is a fragmentary edge view showing the candle socket or holder.

Referring more particularly to the drawing, 5 denotes a pair of spaced shanks which are connected at one end by a loop 6 as usual to form the handle of the implement. Between the shanks are pivoted the spike 7 and the hook 8. The pivot pin 9 which secures the spike also secures the hook. These parts are so dimensioned that they may be swung into the loop as shown in Fig. 1, thus reducing the implement to small compass, and enabling it to be conveniently carried in the pocket. When in this position, the butt ends of the shanks 10 and 11, respectively, of the spike and hook, extend substantially flush with the outer ends of the shanks 5, and as the point of the spike and the bill of the hook lie within the loop, there are no sharp projecting parts to catch in the pocket.

The candle socket or holder comprises a split tube 12 having at its ends projecting similar ears 13. The tube fits the outer face of one of the shanks 5, that side of the tube fitting on said face being flat so as to fit squarely thereagainst. The ears project outwardly from this side of the tube, and are of a length to straddle both shanks 5, as well as the shanks 10 and 11, they fitting snugly the opposite edges thereof. The outer edges of the ears are formed with notches 14, the purpose of which will be presently described. One of the side walls of the notches is beveled as indicated at 15. From one of the side edges of the ears project lugs 16 by means of which the ears are pivotally connected to similar lugs located on one of the shanks, the lugs being so located that the ears may be swung entirely clear of the shanks 5, 10 and 11 as shown in Fig. 3. With the ears in this position, the spike and hook are free to be swung into and out of the loop 6, and upon swinging said parts into the loop, and then swinging the tube 12 on its pivot so as to engage the ears 13 over the opposite edges of said parts and the shanks 5, as shown in Fig. 1, the spike and hook are securely held in folded position.

Fig. 2 shows the position of the spike and the hook when the implement is ready for use. The spike is shown extended horizontally so that it may be stuck into the wall of the tunnel, gallery or the like, and the hook is swung on its pivot so as to extend vertically at right angles to the spike, in order that the implement may be hung up by said hook if desired. The bore of the tube 12 extends parallel to the hook, in order that the candle may be held in upright position. The hook is locked in upright position by swinging the tube 12 so that the shank 11 fits in the notches 14. The ears are so located with respect to the pivot 9, that the shank of the hook is engaged on opposite sides of said pivot, whereby it is securely locked in upright position. The ears also engage the opposite edges of the spike shank 10, on opposite sides of its pivot, whereby the spike is also locked in open or extended position.

The pivot of the tube 12 extends at right angles to the pivot 9, in view of which it will be seen that when the ears 13 are in the position shown in Figs. 1 and 2, they extend across the path in which the shanks 10 and 11 swing, thus securely locking them as described.

The hook 8 may be reversed and the implement inverted, thus making it right or left-handed, and enabling it to be mounted in places where it would be impossible to mount an implement devoid of the feature.

The bevels 15 facilitate the entry of the hook shank into the notches 14.

The implement herein described is simple in structure, and can be readily opened up for use, or folded, and it effectually serves the purpose for which it is designed.

I claim:

A miner's candle stick comprising spaced shanks, a spike and a hook pivoted therebetween, a candle socket pivoted to one of the shanks, and ears projecting from the socket, said ears being adapted to straddle the shanks and the parts pivoted therebetween, and having alined notches in one of their edges through which the shank of the hook extends when in open position, whereby said hook-shank is engaged on opposite sides and on one side of its pivot by one of said ears, and on opposite sides and on the other side of its pivot by the other ear.

In testimony whereof I affix my signature in presence of two witnesses.

CARL FISK.

Witnesses:
J. W. G. HANFORD,
M. M. NOTEWARE.